(12) United States Patent
Shibano (10) Patent No.: US 8,075,113 B2
(45) Date of Patent: Dec. 13, 2011

(54) CONNECTION MECHANISM AND INK SUPPLY APPARATUS EQUIPPED WITH CONNECTION MECHANISM

(75) Inventor: Makoto Shibano, Tokyo (JP)

(73) Assignees: Ortek Corporation, Tokyo (JP); Riso Kagaku Corporation, Tokyo (JP)

( * ) Notice: Subject to any disclaimer, the term of this patent is extended or adjusted under 35 U.S.C. 154(b) by 360 days.

(21) Appl. No.: 12/493,657

(22) Filed: Jun. 29, 2009

(65) Prior Publication Data

US 2010/0002061 A1    Jan. 7, 2010

(30) Foreign Application Priority Data

Jul. 3, 2008    (JP) ................... 2008-174168

(51) Int. Cl.
*B41J 2/175*    (2006.01)
*A61M 5/00*    (2006.01)
(52) U.S. Cl. .................. 347/85; 347/84; 604/249
(58) Field of Classification Search .............. 347/84, 347/85; 137/71, 74; 604/33, 91, 247, 248, 604/249, 256
See application file for complete search history.

(56) References Cited

U.S. PATENT DOCUMENTS

| | | | |
|---|---|---|---|
| 5,215,538 A * | 6/1993 | Larkin | 604/249 |
| 6,390,611 B1 * | 5/2002 | Kobayashi et al. | 347/84 |
| 6,612,689 B2 * | 9/2003 | Suenaga et al. | 347/85 |
| 7,597,433 B2 * | 10/2009 | Tanahashi et al. | 347/86 |
| 2007/0176987 A1 | 8/2007 | Tanahashi et al. | |

FOREIGN PATENT DOCUMENTS

JP    2007-175998    7/2007

* cited by examiner

*Primary Examiner* — Anh T. N. Vo (74) *Attorney, Agent, or Firm* — Holtz, Holtz, Goodman & Chick, PC (57) ABSTRACT

When a second cylindrical unit 38 of a second connection unit 11 is pushed into a first cylindrical unit 16 of a first connection unit 15, a sliding member 23 moves along an axis member. With the timing, the position of a moving aperture 22 formed on the sliding member 23 moves from the first position not opposite a first aperture 19 and a second aperture 51 to the second position opposite the first aperture 19 and the second aperture 51.

19 Claims, 6 Drawing Sheets

CONNECTION MECHANISM AND INK SUPPLY APPARATUS EQUIPPED WITH CONNECTION MECHANISM

CROSS REFERENCE TO RELATED APPLICATION

This application is based upon and claims the benefit of priority from the prior Japanese Application No. 2008-174168, filed Jul. 3, 2008, the entire contents of which are incorporated herein by reference.

BACKGROUND OF THE INVENTION

1. Field of the Invention

The present invention relates to a connection mechanism and an ink supply apparatus provided with the connection mechanism, and more specifically to a connection of an ink cartridge in an ink jet printer.

2. Description of the Related Art

An ink jet printer (printer) is provided with an ink supply apparatus for supplying ink to a recording head.

A common ink supply apparatus is provided with an ink cartridge having a connection unit freely attached to and detached from the printer, and a cartridge holder unit having a connection unit for connection with the ink cartridge. The connection unit of a cartridge holder unit is coupled to an ink path to the recording head.

When the ink cartridge is attached to the cartridge holder unit, the connection unit of the cartridge holder unit is connected to the connection unit of the ink cartridge. After the ink cartridge is completely attached, the ink in the ink cartridge is supplied to the recording head through the ink path.

When the ink cartridge is removed from the cartridge holder unit, the ink can sometimes leak out of the connection portion.

Japanese Laid-open Patent Publication No. 2007-175998 discloses an ink supply apparatus with leaks of ink prevented from the connection portion.

According to Japanese Laid-open Patent Publication No. 2007-175998, when the ink cartridge is not attached, an ink inlet of an ink supply tube is closed by a valve, and an ink supply intake of the ink cartridge is closed by a piston. With the configuration, the leak of ink can be prevented.

When the ink cartridge is attached, a tip portion of the ink supply tube is inserted into the ink cartridge. A tip portion of the piston on the ink cartridge side pushes back the valve into the inner part that stops the ink inlet of the ink supply tube. Thus, the ink inlet is opened.

Next, the pushed back valve touches a valve stopper. When the movement of the valve is regulated, the piston recedes against the urging force of a regaining spring based on the repulsive force from the valve. Thus, the ink supply intake of the ink cartridge is opened, and the ink in the ink cartridge can be supplied to the recording head through the ink supply tube.

SUMMARY OF THE INVENTION

The connection mechanism according to the present invention is configured by a first connection unit and a second connection unit placed opposite the first connection unit. The first connection unit includes: a first cylindrical unit whose connection end has an aperture; an axis member fixed to the bottom opposite the aperture of the first cylindrical unit; a first liquid path having a first aperture formed in the bottom; a first moving member fitting to the axis member and having a moving aperture moving while sliding on the inside surface of the first cylindrical unit in the axis direction of the axis member; and an urging member for urging the first a moving member toward the connection end. The second connection unit includes: a second cylindrical unit having a second aperture whose connection end side is a bottom; a second moving member provided inside the second cylindrical unit and having a second liquid path at a position opposite the second aperture; and an urging member for urging the second moving member toward the connection end. By pushing the second cylindrical unit into the first cylindrical unit, the first moving member moves by rotating along the axis member from a first position in which the position of the moving aperture is not opposite the first aperture and the second aperture to a second position in which the position of the moving aperture is opposite the first aperture and the second aperture, and the first liquid path is linked to the second liquid path.

The ink supply apparatus according to the present invention has an ink cartridge for storing ink and a holder unit for holding the ink cartridge, and supplies ink by connecting a first connection unit provided for the holder unit to a second connection unit provided for the ink cartridge. The first connection unit includes: a first cylindrical unit whose connection end has an aperture; an axis member fixed to the bottom opposite the aperture of the first cylindrical unit; a first ink path having a first aperture formed in the bottom; a first moving member fitting to the axis member and having a moving aperture moving while sliding on the inside surface of the first cylindrical unit in the axis direction of the axis member; and an urging member for urging the first moving member toward the connection end. The second connection unit includes: a second cylindrical unit having a second aperture whose connection end side is a bottom; a second moving member provided inside the second cylindrical unit and having a second ink path at a position opposite the second aperture; and an urging member for urging the second moving member toward the connection end. By pushing the second cylindrical unit into the first cylindrical unit, in the first connection unit, the first moving member moves by rotating along the axis member from a first position in which the position of the moving aperture is not opposite the first aperture to a second position in which the position of the moving aperture is opposite the first aperture, and in the second connection unit, the second moving member linearly moves from a third position in which the ink in the ink cartridge does riot flow into the second ink path to a fourth position in which the ink in the ink cartridge flows into the second ink path, and when the second connection unit is connected to the second connection unit, the second aperture is linked to the second aperture through the moving aperture.

DESCRIPTION OF THE PREFERRED EMBODIMENTS

The embodiments of the present invention are described below with reference to the attached drawings.

First Embodiment

Figure 1:
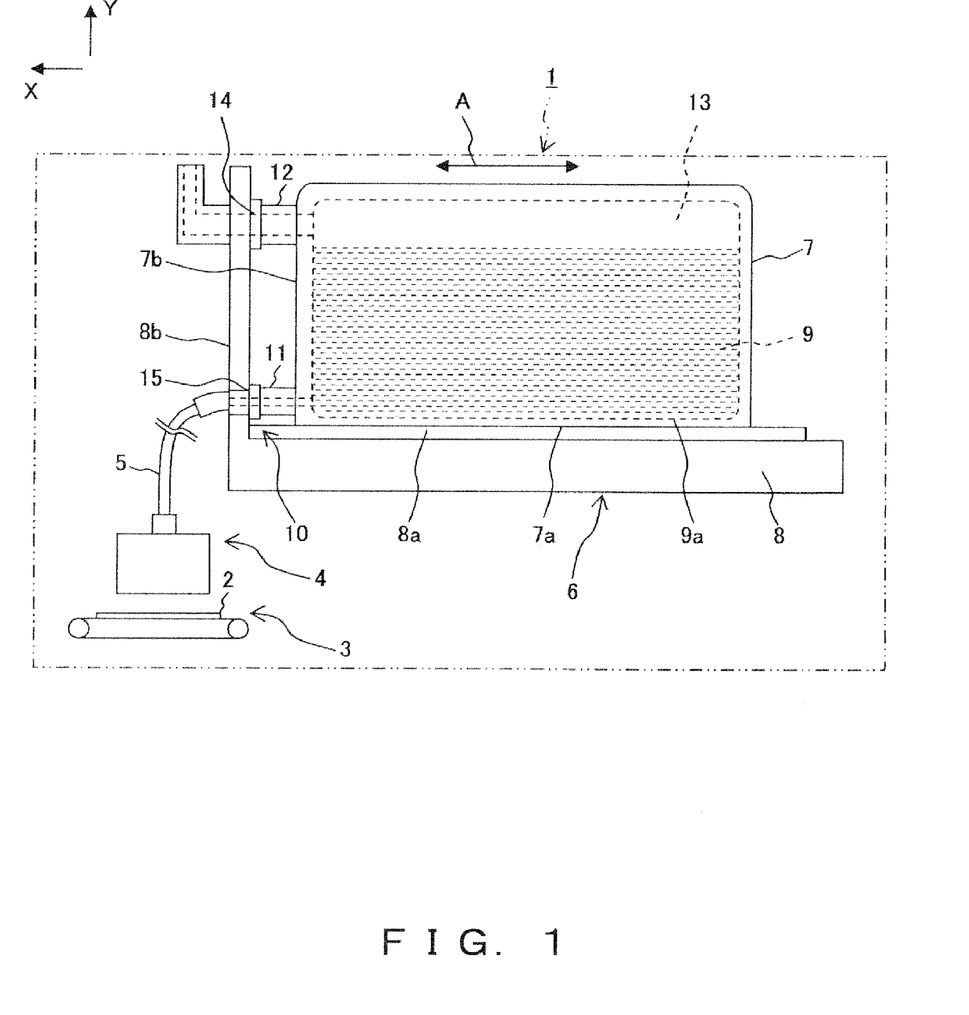
FIG. 1 is a side view roughly illustrating the image record apparatus provided with an ink supply apparatus having a connection mechanism according to the first embodiment of the present invention.

FIG. 1 is a side view roughly illustrating the image record apparatus provided with an ink supply apparatus having a connection mechanism according to the first embodiment of the present invention. In FIG. 1, the perpendicular direction (up and down on the figure) is defined as a Y direction, and the direction orthogonal to the Y direction (right and left on the figure) is defined as an X direction.

As illustrated in FIG. 1, an image record apparatus 1 includes: a conveying mechanism 3 for conveying a record medium 2 such as a paper sheet, film, etc. for recording an image; a record unit 4 for discharging ink to the record medium 2; an ink supply apparatus 6 for supplying ink of a predetermined color to the record unit 4 through a supply tube 5, etc.

By the record unit 4 discharging ink to the record medium 2 conveyed by the conveying mechanism 3, the image record apparatus 1 records a desired image on the record medium 2. The record unit 4 according to the present embodiment can be of the line type or the serial type.

Described next is the ink supply apparatus 6. The ink supply apparatus 6 includes an ink cartridge 7, and a cartridge holder unit 8 (hereinafter referred to simply as a holder unit) to which the ink cartridge 7 is attached.

In FIG. 1, only one ink cartridge 7 is illustrated, but practically ink cartridges 7 to be used are provided.

The ink cartridge 7 of the ink supply apparatus 6 is configured by an ink storage unit 9 storing ink, a second connection unit 11 as one connection unit of a connection mechanism 10 for connection to the ink flow path of the holder unit 8, and an air path unit 12.

In the present embodiment, the ink cartridge 7 is substantially a rectangular parallelepiped, and a bottom surface 7a is flat. When the ink cartridge 7 is placed on a bottom 8a of the holder unit 8, the longitudinal direction of the rectangular parallelepiped of the ink cartridge 7 is parallel to the X direction.

Then, as indicated by the arrow A, the ink cartridge 7 can be attached to and detached from the holder unit 8 along the X direction (horizontal direction).

The ink storage unit 9 of the ink cartridge 7 stores ink of a predetermined color, and is cut off from the outside excluding the air path unit 12. A bottom 9a of the ink storage unit 9 is inclined downward the second connection unit 11 provided at the lower end of a side unit 7b of the ink cartridge 7.

An air chamber 13 is provided in the Y direction, that is, at the upper portion with respect to the gravity when the ink cartridge 7 is placed on the holder unit 8. The air path unit 12 is provided so that the air path unit 12 can be linked to the air chamber 13.

The air path unit 12 has a well known valve mechanism for cutting off the ink storage unit 9 from the outside. By opening the valve mechanism, air can be taken into the ink storage unit 9. That is, when the ink cartridge 7 is attached to the holder unit 8 and the air path unit 12 is connected to an air connection unit 14 provided for the holder unit 8, the valve mechanism is opened. Thus, the ink storage unit 9 is open to air.

The air path unit 12 is provided for the side unit 7b such that the path axis can be extended to the direction orthogonal to the side unit 7b of the ink cartridge 7. That is, the axis of the air path unit 12 is placed substantially parallel to the axis of the ink cartridge 7 in the longitudinal direction. In the present embodiment, the air path unit 12 is provided at the top of the side unit 7b of the ink cartridge 7 in the Y direction.

The other holder unit 8 of the ink supply apparatus 6 has the bottom 8a which is extended to the horizontal direction (X direction in FIG. 1) and a side unit 8b which is extended to the Y direction orthogonal to the bottom 8a. The bottom 8a touches the bottom surface 7a of the ink cartridge 7 and holds the ink cartridge 7, when the ink cartridge 7 is attached to the holder unit 8.

As described later in detail, a first connection unit 15 as the other connection unit of the connection mechanism 10 and the air connection unit 14 are fixed to the side unit 8b. The first connection unit 15 is connected to the second connection unit 11 of the ink cartridge 7, and the air connection unit 14 is connected to the air path unit 12 of the ink cartridge 7.

The air connection unit 14 is connected to the air path unit 12 of the ink cartridge 7, then it allows to ventilate the ink cartridge 7 by the outside air.

The axis of one end of the air connection unit 14 is extended to the X direction, and the axis of the other end is extended to the Y direction, thereby indicating substantially an L-shaped form. The air connection unit 14 also has a through hole from one end to the other. The ends of the through hole are open.

Figure 2A:
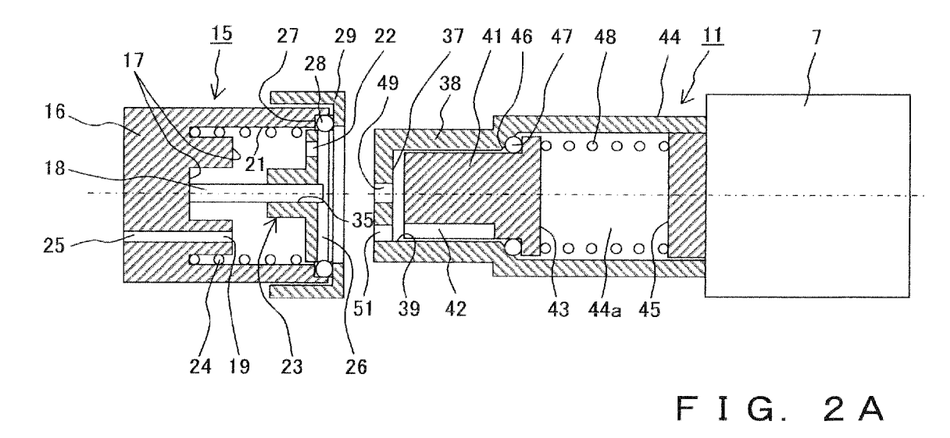
FIG. 2A is a sectional view of the inner configuration of the first and second connection units configuring the connection mechanism according to the first embodiment of the present invention.
Figure 2B:
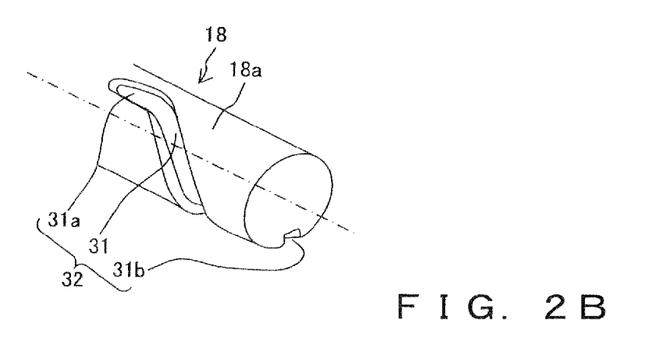
FIG. 2B illustrates an axis member of the first connection unit.
Figure 2C:
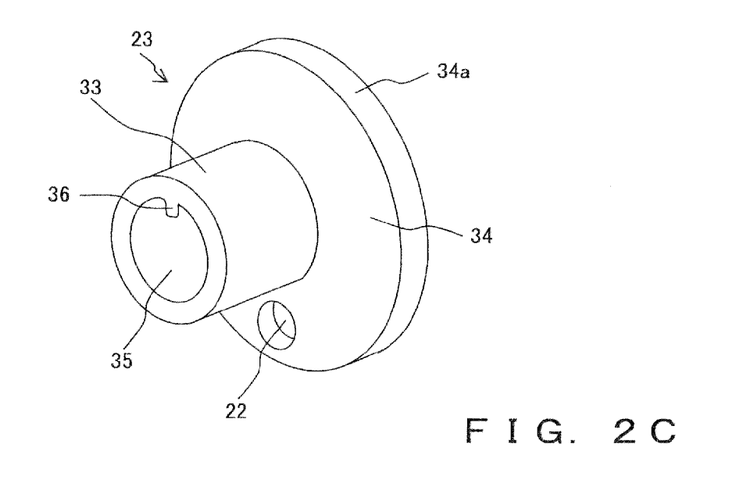
FIG. 2C illustrates a sliding member of the first connection unit.

FIG. 2A is a sectional view of the inside configurations of the first connection unit 15 and the second connection unit 11. FIG. 2B illustrates an axis member of the first connection unit. FIG. 2C illustrates a sliding member of the first connection unit.

In FIG. 2A, the ink cartridge 7 is simplified.

As illustrated in FIGS. 2A, 2B, and 2C, the first connection unit 15 forming part of the other connection unit of the connection mechanism 10 includes a first cylindrical unit 16 having an aperture 26 at the connection end, an axis member 18 fixed to the center of a bottom 17 of the first cylindrical unit 16, and a first ink path 25 as the first liquid path formed at a predetermined position of the bottom 17.

The first connection unit 15 is further provided with a sliding member 23 as a first moving member for sliding on an inside surface 21 of the first cylindrical unit 16 and having a moving aperture 22 moving between the first position and the second position, and a pressure spring 24 as an urging member for urging the sliding member 23 toward the connection end.

A step portion 27 is provided at the inside of the brim of the aperture 26 of the first connection unit 15. An O-shaped ring 28 is attached to the step portion 27.

A cap 29 is fixed over the outside of the ring-shaped brim of the aperture 26 and the outside surface. The cap 29 presses the O-shaped ring 28 from outside. That is, the O-shaped ring 28 is interposed and held between the step portion 27 and the cap 29, thereby preventing the O-shaped ring 28 from slipping off the step portion 27.

The first ink path 25 is linked to the supply tube 5 for supplying ink to the record unit 4. The aperture at the connection end of the first ink path 25 is defined as a first aperture 19. In the present embodiment, the first ink path 25 is provided at the lowermost position (bottom) in the first cylindrical unit 16 in the perpendicular direction.

The axis member 18 extends to the vicinity of the aperture 26 in the back and forth direction of the ink cartridge 7 from the center of the bottom 17 of the first cylindrical unit 16. As illustrated in FIG. 2B, an outside groove 32 is formed in an outside surface 18a of the axis member 18. The outside groove 32 is configured by a spiral groove 31, and linear grooves 31a and 31b parallel to the axis of the axis member 18 at both ends of the spiral groove 31.

As illustrated in FIG. 2C, the sliding member 23 is configured by a cylindrical unit 33 and a flange unit 34 incorporated into a unitary construction. An engaging hole 35 for fitting to the axis member 18 is formed in the cylindrical unit 33 and the flange unit 34. A projection 36 is provided at a part of the inside surface of the fitting hole 35.

As illustrated in FIG. 2A, the sliding member 23 allows the projection 36 to be engaged with the outside groove 32 of the axis member 18, and allows an outside surface 34a of the flange unit 34 to slide on the inside surface 21 of the first cylindrical unit 16.

Then, as illustrated in FIG. 2A, when the first connection unit 15 and the second connection unit 11 are disconnected, the flange unit 34 of the sliding member 23 is urged from inside toward the aperture 26 by the pressure spring 24, and held by the O-shaped ring 28. Thus, the flange unit 34 cuts off the inside of the first cylindrical unit 16 from the outside.

As illustrated in FIG. 2A, the second connection unit 11 forming one connection unit of the connection mechanism 10 is provided with a second cylindrical unit 38 having a connection end as a bottom 37, and a cylinder member 41 as a second moving member sliding on an inside surface 39 of the second cylindrical unit 38.

The cylinder member 41 has, a second ink path 42 as a second liquid path for supply of ink in the ink storage unit 9 of the ink cartridge 7 to the first connection unit 15 at a predetermined position of the outside surface (the lowermost portion in FIG. 2A). A flange 43 is formed to be incorporated into the back end portion of the cylinder member 41 (rightmost portion in the figure). A large diameter cylindrical unit 44 larger than the inside diameter of the second cylindrical unit 38 is incorporated into the back portion of the second cylindrical unit 38 (on the right in the figure) The large diameter cylindrical unit 44 encloses a connection holding unit 45 of the ink cartridge 7, and is connected to the ink cartridge 7.

The large diameter cylindrical unit 44 is linked to the ink storage unit 9 of the ink cartridge 7 through a circulation hole (not illustrated in the attached drawings) of the connection holding unit 45, and a space 44a of the large diameter cylindrical unit 44 is filled with ink.

An inclined step portion 46 is provided at the boundary between the second cylindrical unit 38 and the large diameter cylindrical unit 44 on the inside surface. A gap is formed between the inside surface of the large diameter cylindrical unit 44 and the outside surface of the flange 43 of the cylinder member 41.

An O-shaped ring 41 fits to the cylinder member 41 and pressed against the flange 43. A pressure spring 48 is interposed as an urging member between the flange 43 and the connection holding unit 45.

As illustrated in FIG. 2A, when the first connection unit 5 and the second connection unit 11 are disconnected, the pressure spring 48 urged flange 43 toward the connection end (on the left in the figure) of the second connection unit 11, thereby pushing the tip of the cylinder member 41 (leftmost portion in the figure) to the position close to the bottom 37 of the second cylindrical unit 38.

Thus, the O-shaped ring 47 is interposed and held between the flange 43 and the inclined step portion 46, and cuts off the inside of the large diameter cylindrical unit 44 from the second cylindrical unit 38. That is, the ink of the ink storage unit 9 of the ink cartridge 7 can be cut off from the outside.

Formed at the bottom 37 of the second cylindrical unit 38 are a fitting hole 49 as a guide unit into which the axis member 18 of the first connection unit 15 is inserted, and a second aperture 51 as an ink supply intake at the position opposite the second ink path 42.

Described below is the operation of connecting by the connection mechanism 10 with the above-mentioned configuration.

Figure 3A:
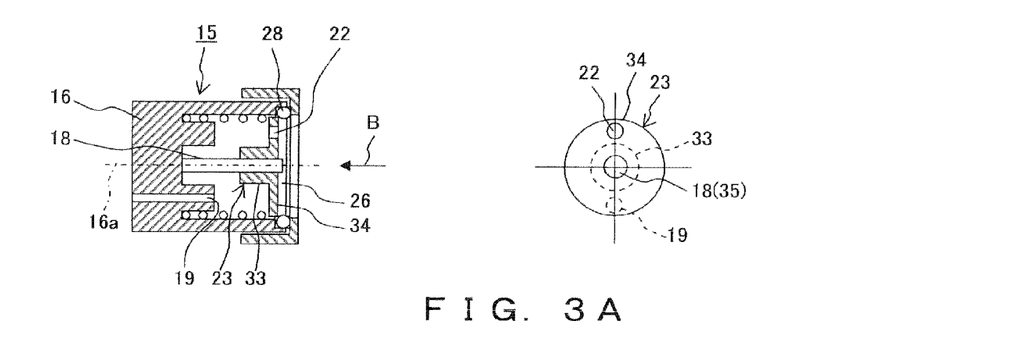
FIGS. 3A through 3D are explanatory views of the state of the connecting operation according to the first embodiment.
Figure 3B:
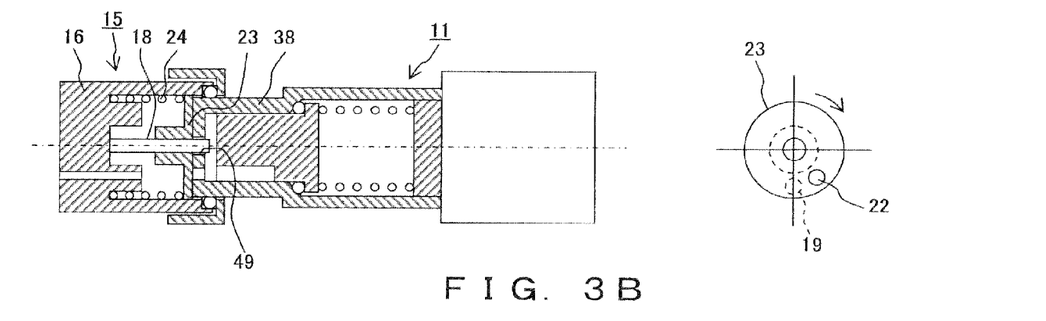
Figure 3C:
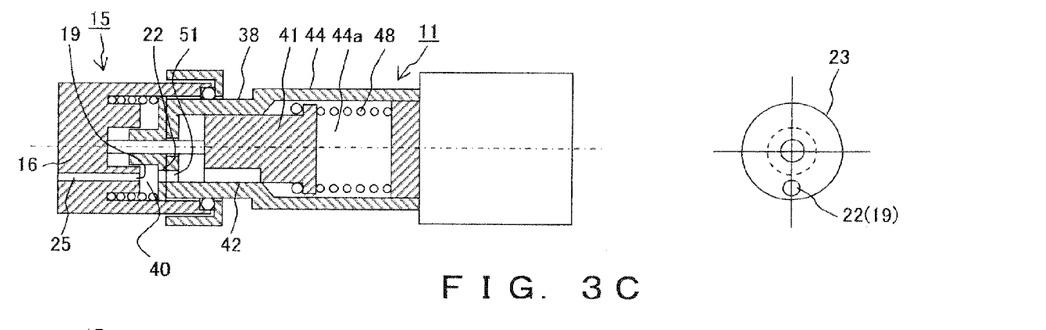
Figure 3D:
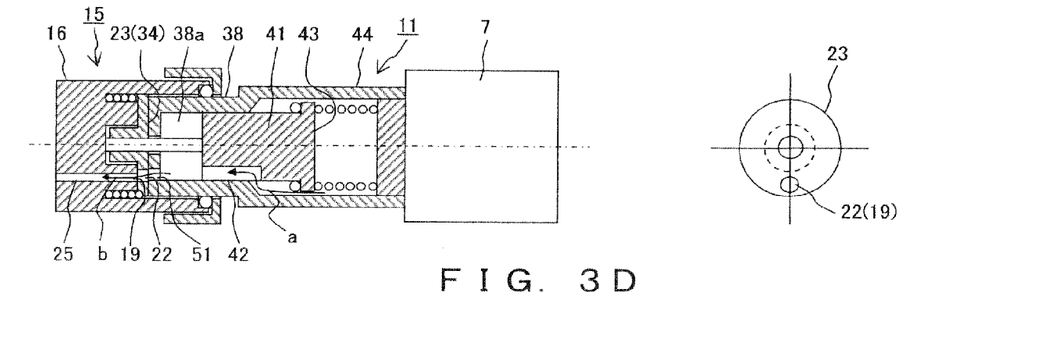

FIG. 3A illustrates the first connection unit 15 illustrated in FIG. 2A on the left, and the sliding member 23 as viewed in the direction of the arrow B on the right. FIGS. 3B through 3D illustrate the state of the connecting operation.

In FIGS. 3A through 3D, the components to be described as the same components in configuration as the components in FIGS. 2A, 2B, and 2C are assigned the same reference numerals.

As illustrated in FIG. 2A, when the first connection unit 15 and the second connection unit 11 are disconnected, the sliding member 23 of the first connection unit 15 cuts off the aperture 26 of the first cylindrical unit 16 from the outside by the pressure spring 24. That is, the flange unit 34 and the O-shaped ring 28 are pressed against each other. The moving aperture 22 of the sliding member 23 is placed at the top as the first position. The position is relative to the first aperture 19 of the first ink path 25, and is opposite a center line 16a of the first cylindrical unit 16.

The cylinder member 41 of the second connection unit 11 cuts off the ink of the ink storage unit 9 of the ink cartridge 7 from the outside by the pressure spring 48. That is, the flange 43 and the O-shaped ring 47 are pressed against the inclined step portion 46.

As described above, the sliding member 23 is engaged with the outside groove 32 of the axis member 18 illustrated in FIG. 2B by the projection 36.

Therefore, in the initial state of the connection between the first connection unit 15 and the second connection unit 11, the bottom 37 (tip portion of the second connection unit 11) of the second cylindrical unit 38 of the second connection unit 11 fits to the first cylindrical unit 16 of the first connection unit 15, thereby pushing the sliding member 23 in the direction of the axis of the axis member 18 against the urging force of the pressure spring 24. The sliding member 23 moves by the guide of the linear groove 31b of the outside groove 32 formed in the axis member 8. Simultaneously, the tip of the axis member 18 of the first cylindrical unit 16 fits to the fitting hole 49 of the second cylindrical unit 38, and enters the second cylindrical unit 38.

Next, when the tip portion of the second cylindrical unit 38 is further pushed into the first cylindrical unit 6, the sliding member 23 moves along the spiral groove 31 of the outside groove 32. Therefore, the sliding member 23 is pushed in the axis direction of the axis member 18 while rotating as illustrated in FIG. 3B. In FIG. 3B, the sliding member 23 rotates clockwise.

Then, when the tip portion of the second cylindrical unit 38 is further pushed into the first cylindrical unit 16, it results in the state illustrated in FIG. 3C. That is, as illustrated on the right in FIG. 3C, the sliding member 23 moves with rotation to the position where the moving aperture 22 faces the first aperture 19, and the position where the moving aperture 22 is linked to the second aperture 51. That is, the spiral groove 31 of the outside groove 32 is formed such that the sliding member 23 can rotate into the position (second position) in which the moving aperture 22 faces the first aperture 19. With the timing, a gap 40 is formed between the bottom 17 of the first cylindrical unit 16 and the flange unit 34.

On the other hand, the tip of the axis member 18 moves relatively further into the second cylindrical unit 38. That is, the tip of the axis member 18 presses the cylinder member 41 toward the space 44a of the large diameter cylindrical unit 44 against the urging force of the pressure spring 48.

Thus, the cylinder member 41 moves to the position illustrated in FIG. 3C from the position illustrated in FIG. 3B (as in FIG. 2A). In this state, however, the back end (on the right in the figure) of the second ink path 42 is not linked to the space 44a filled with ink. The position illustrated in FIG. 3B where the second ink path 42 is not linked to the space 44a is defined as the initial position (third position) of the cylinder member 41.

When the tip portion of the second cylindrical unit 38 is further pushed into the first cylindrical unit 16 from the state illustrated in FIG. 3C, the sliding member 23 is pushed in the axis direction of the axis member along the linear groove 31a. That is, in this state, the sliding member 23 is pushed without rotation. Then, as illustrated in FIG. 3D, the sliding member 23 is pushed until the gap 40 is blocked. Thus, the first aperture 19 of the first ink path 25, the moving aperture 22 of the flange unit 34, and the second aperture 51 are linked to each other without a gap. This position is defined as a coupling position.

Simultaneously, the tip of the axis member 18 pushes the cylinder member 41 toward the space 44a, thereby coupling the back end (on the right in the figure) of the second ink path 42 to the space 44a filled with ink. The position of the cylinder member 41 in this state is defined as a fourth position. Thus, the ink in the large diameter cylindrical unit 44 flows through the second ink path 42 as indicated by the arrow a, and flows into the second cylindrical unit 38. Furthermore, the ink that has entered the second cylindrical unit 38 flows into the first ink path 25 through the second aperture 51, the moving aperture 22, and the first aperture 19 as indicated by the arrow b. Then, the ink is supplied to the record unit 4 through the supply tube 5 illustrated in FIG. 1.

As described above, according to the present embodiment, in the connection mechanism 10 configured by the first connection unit 15 and the second connection unit 11 arranged opposite the first connection unit 15, the first connection unit 15 includes the first cylindrical unit 16 whose connection end is open, the axis member 18 fixed to the bottom 17 of the first cylindrical unit 16, the first ink path 25 formed at a predetermined position of the bottom 17 and having the first aperture 19 as a liquid flow path, and the sliding member 23 having the moving aperture 22 capable of moving with rotation to the first position or the second position.

The second connection unit 11 includes the second cylindrical unit 38 whose connection end is the bottom 31, and the cylinder member 41 having the second ink path 42 capable of moving to the third position or the fourth position in the second cylindrical unit 38.

From the state in which the first connection unit 15 is not connected to the second connection unit 11, the second connection unit 11 is pushed into the first cylindrical unit 16 of the first connection unit 15. Thus, in the first connection unit 15, the sliding member 23 moves along the axis member 18, and the moving aperture 22 moves with rotation from the first position to the second position. In the second connection unit 11, the axis member 18 linearly moves the cylinder member 41 from the third position to the fourth position. Finally, the first ink path 25 is linked to the second ink path 42 through the moving aperture 22.

Figure 4A:
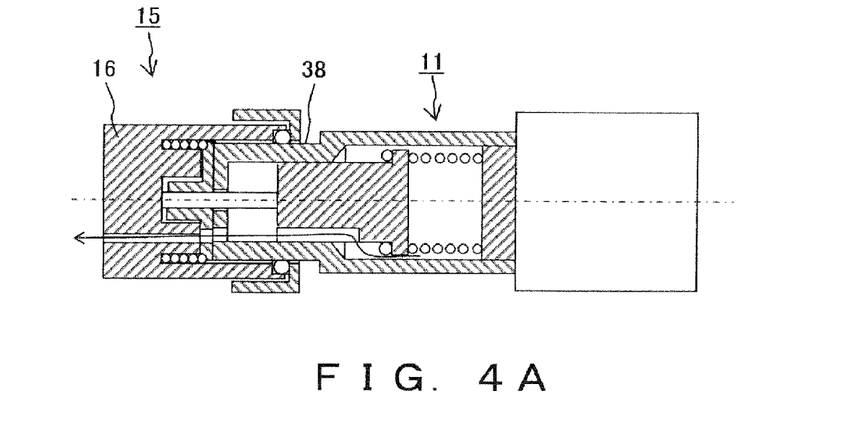
FIGS. 4A, 4B and 4C are explanatory views of the state of the disconnecting operation according to the first embodiment.
Figure 4B:
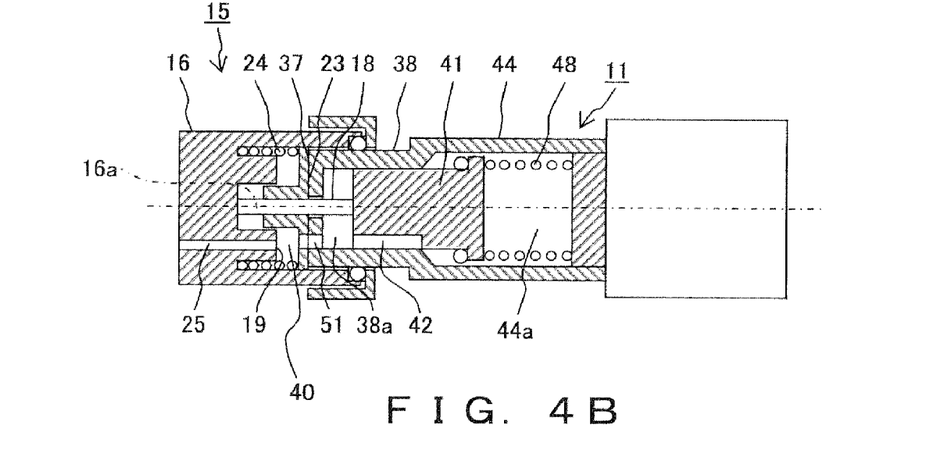

FIGS. 4A and 4B are explanatory views of the operating state in which the connection between the first connection unit 15 and the second connection unit 11 is released. FIG. 4A show the same state as in FIG. 3D.

When the first connection unit 15 and the second connection unit 11 are connected as illustrated in FIG. 4A, and when the second cylindrical unit 38 is drawn from the first cylindrical unit 16, it begins with the state illustrated in FIG. 4B. That is, the cylinder member 41 moves toward the bottom 37 of the second cylindrical unit 38 by the urging force of the pressure spring 48 at the second connect on unit 11. Then, the coupling between the second ink path 42 and the large diameter cylindrical unit 44 is cut off. That is, the cylinder member 41 moves from the fourth position to the third position. At the first connection unit 15, the sliding member 23 moves toward the connection end (aperture 26 side) by the guide of the linear groove 31a through the urging force of the pressure spring 24. In detail, the sliding member 23 moves in the state in which the moving aperture 22 faces the first aperture 19, and the moving aperture 22 is linked to the second aperture 51, thereby forming the gap 40. With the timing, the ink stored in a space 38a of the second cylindrical unit 38 is returned to the large diameter cylindrical unit 44 in the process until the coupling between the second ink path 42 and the large diameter cylindrical unit 44 is cut off. There can be some ink remaining in the space 38a. The ink remaining in the space 38a flows into the gap 40 through the second aperture 51 and the moving aperture 22 by the cylinder member 41 moving toward the bottom 37 of the second cylindrical unit 38 by the urging force of the pressure spring 48. Therefore, it is desired that the gap 40 has a capacity for the remaining ink.

Figure 4C:
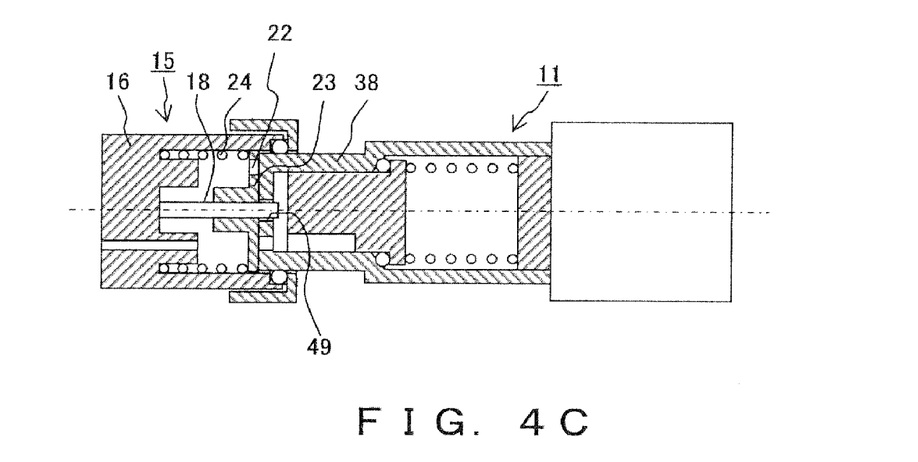

When the second cylindrical unit 38 is further drawn from the first cylindrical unit 16, the sliding member 23 moves by the spiral groove 31 as a guide. The sliding member 23 rotates in the reverse direction of the connecting direction, and the moving aperture 22 moves with rotation from the second position to the first position. (FIG. 4C) That is, the moving aperture 22 moves above the first aperture 19 and the second aperture 51 in the perpendicular direction. Thus, the ink that has flown to the gap 40 is prevented from flowing outside the sliding member 23. The release of the connection is completed by further exiting from the state illustrated in FIG. 4C.

As described above, in the connection mechanism 10 configured by the first connection unit 15 and the second connection unit 11 arranged opposite the first connection unit 45 in the present embodiment, the second cylindrical unit 38 of the second connection unit 11 is drawn from the first cylindrical unit 16 of the first connection unit 15 to release the connection of the first connection unit 15 and the second connection unit 11. The moving aperture 22 moves from the second position to the first position, and cuts off the first ink path 25 of the first connection unit 15 from the second aperture 51 of the second connection unit 11. Thus, the connection between the first connection unit 15 and the image record apparatus 1 can be released without spoiling the system.

In the state transition from the disconnected state to the connected state by the above-mentioned first connection unit 15 and the second connection unit 11, or in the state transition from the connected state to the disconnected state, the center axis of the second cylindrical unit 38 is placed on the same axis line as the central axis of the first cylindrical unit 16.

Second Embodiment

Figure 5A:
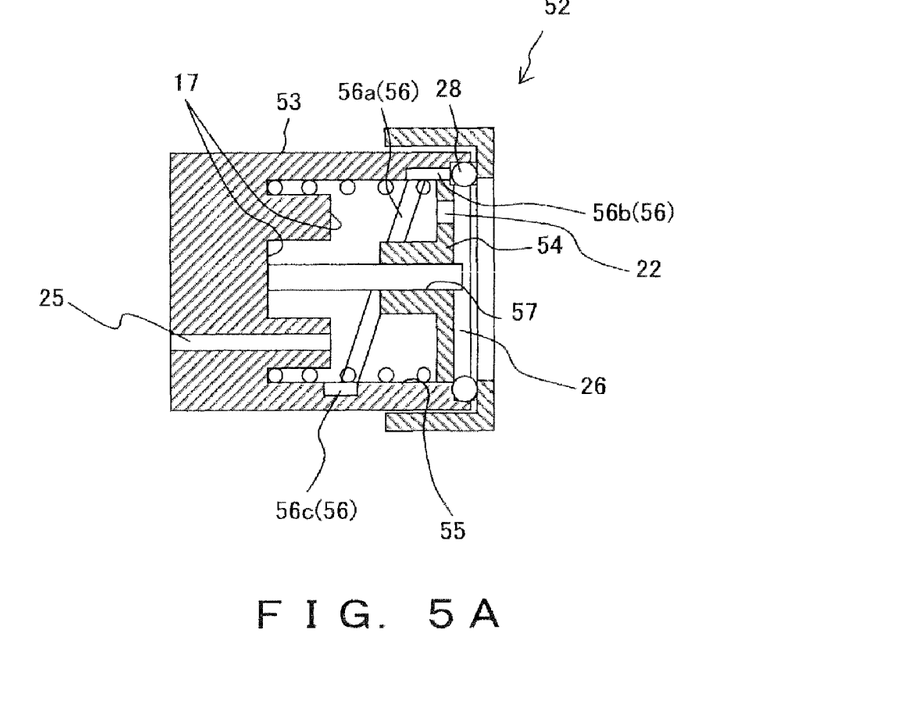
FIG. 5A is a sectional view of the configuration of the first connection unit according to the second embodiment of the present invention.
Figure 5B:
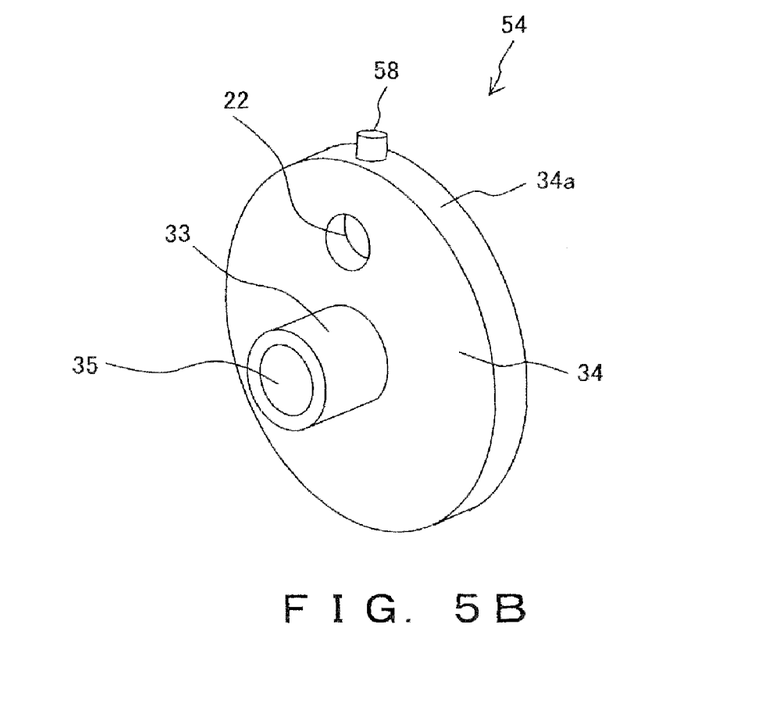
FIG. 5B is a perspective view of the configuration of the sliding member according to the second embodiment of the present invention.

FIG. 5A is a sectional view of the configuration of the first connection unit according to the second embodiment. FIG. 5B is a perspective view of the configuration of the sliding member of the first connection unit. The configuration of the second connection unit according to the present embodiment is the same as the configuration of the second connection unit 11 according to the first embodiment. In FIGS. 5A and 5B, the same components as those illustrated in FIGS. 2 through 4 are assigned the same reference numerals as those in FIGS. 2 through 4.

As illustrated in FIG. 5A, a first cylindrical unit 53 has an inside groove 56 on its inside surface 55. The inside groove 56 has a spiral groove 56a and linear grooves 56b and 56c provided as linked to each other on both ends of the spiral groove 56a. No grooves etc. are formed on the outside surface of an axis member 57. As illustrated in FIG. 5B, a sliding member 54 has no projection 36 illustrated in FIG. 2C, but is provided with an outside surface projection 58 on the outside surface 34a of the flange unit 34. Other components such as the bottom 17, the step portion 27, the O-shaped ring 28, etc are the same as those according to the first embodiment illustrated in FIG. 2A.

With the above-mentioned configuration, when the sliding member 54 fits to the axis member 57 through the fitting hole 35, the outside surface projection 58 is engaged with the inside groove 56 of the first cylindrical unit 53 in a freely sliding manner.

When a first connection unit 52 is connected to the second connection unit 11, the sliding member 54 is pushed toward the bottom 17 of the first cylindrical unit 53 by the second connection unit 11. Thus, the outside surface projection 58 slides along the spiral groove 56a of the inside groove 56, thereby rotating the sliding member 54.

As in the first embodiment, the moving aperture 22 moves from the first position to the second position, and functions to link the ink flow path between the first connection unit 52 and the second connection unit 11.

Third Embodiment

Figure 6A:
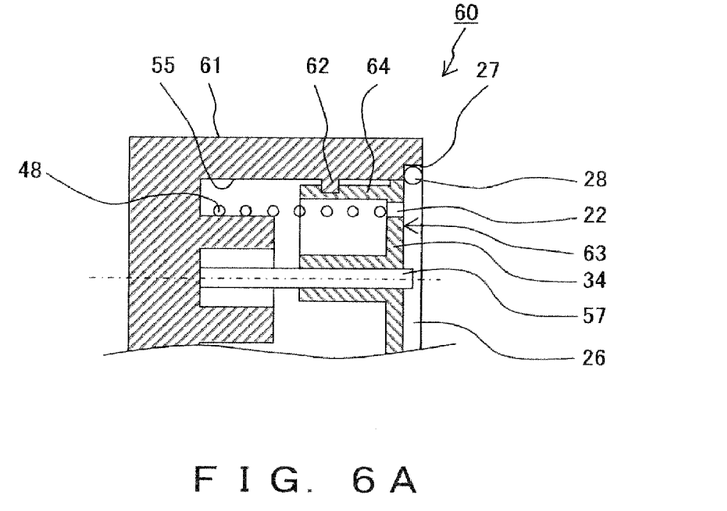
FIG. 6A is a sectional view of the configuration of the first connection unit according to the third embodiment of the present invention.
Figure 6B:
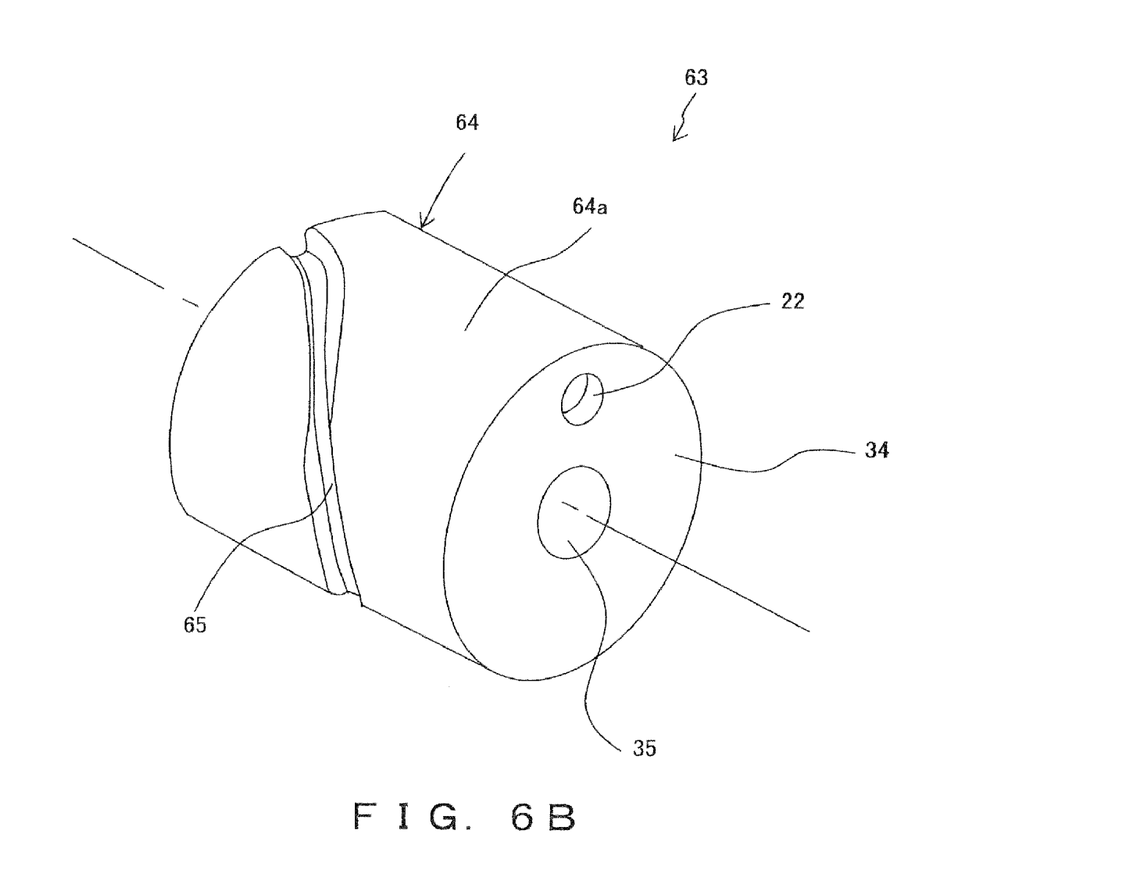
FIG. 6B is a perspective view of the configuration of the sliding member according to the third embodiment of the present invention.

FIG. 6A is a sectional view of the configuration of the first connection unit according to the third embodiment. FIG. 6B is a perspective view of the configuration of the sliding member of the first connection unit. The configuration of the second connection unit according to the present embodiment is the same as the configuration of the second connection unit 11 according to the first embodiment.

In FIGS. 6A and 6B, the same configurations or components as those illustrated in FIGS. 2 through 5 are assigned the same reference numerals as those in FIGS. 2 through 5.

As illustrated in FIG. 6A, a first connection unit 60 according to the third embodiment includes an inside surface projection 62 provided at the upper portion of the inside surface 55 of a first cylindrical unit 61.

A sliding member 63 illustrated in FIG. 6B includes a ring unit 64 incorporated into the flange unit 34 as a unitary construction. An outside surface groove 65 engaged with the inside surface projection 62 of the first cylindrical unit 61 is formed on an outside surface 64a of the ring unit 64. The outside surface groove 65 has a spiral groove and linear grooves formed as linked to both ends of the grooves.

With the above-mentioned configuration, when the sliding member 63 fits to the axis member 57 through the fitting hole 35, the outside surface groove 65 is engaged with the inside surface projection 62 of the first cylindrical unit 61 in a freely sliding manner.

When a first connection unit 60 is connected to the second connection unit 11, the sliding member 63 is pushed toward the bottom 17 of the first cylindrical unit 61 by the second connection unit 11. Thus, the spiral outside surface groove 65 slides along the inside surface projection 62 of the first cylindrical unit 61, thereby rotating the sliding member 63.

As in the first and second embodiments, the moving aperture 22 moves from the first position to the second position, and functions to link the ink flow path between the first connection unit 63 and the second connection unit 11.

The present invention is not limited to the above-mentioned embodiments, but can be varied within the scope of the gist of the present invention in each embodying stage.

The connection mechanism of the present invention is described above as an ink flow path connection mechanism of an ink jet printer, but is not limited to the application, and the connection mechanism of the present invention can be effective in connecting any liquid flow path.

What is claimed is:

1. A connection mechanism comprising a first connection unit and a second connection unit placed opposite the first connection unit, wherein:

the first connection unit comprises: a first cylindrical unit whose connection end has an aperture; an axis member fixed to a bottom opposite the aperture of the first cylindrical unit; a first liquid path having a first aperture formed in the bottom; a first moving member fitting to the axis member and having a moving aperture moving while sliding on an inside surface of the first cylindrical unit in the axis direction of the axis member; and an urging member for urging the first moving member toward the connection end;

the second connection unit comprises: a second cylindrical unit having a second aperture whose connection end side is a bottom; a second moving member provided inside the second cylindrical unit and having a second liquid path at a position opposite the second aperture; and an urging member for urging the second moving member toward the connection end;

by pushing the second cylindrical unit into the first cylindrical unit, the first moving member moves by rotating along the axis member from a first position in which a position of the moving aperture is not opposite the first aperture and the second aperture to a second position in which the position of the moving aperture is opposite the first aperture and the second aperture, and the first liquid path is linked to the second liquid path.

2. The connection mechanism according to claim 1, wherein:

the first moving member has a fitting hole for fitting to the axis member and a projection formed on an inside surface of the fitting hole, and a groove is formed on an outside surface of the axis member;

the first moving member moves along the groove with rotation by engaging the projection with the groove and moving the first moving member in an axis direction of the axis member.

3. The connection mechanism according to claim 1, wherein
the first moving member has a fitting hole fitting to the axis member and a projection on an outside surface touching an inside surface of the first cylindrical unit, and a groove is formed on the inside surface of the first cylindrical unit;
the first moving member moves with rotation along the groove by engaging the projection with the groove and moving the first moving member in an axis direction of the axis member.

4. The connection mechanism according to claim 1, wherein
the first moving member has a fitting hole fitting to the axis member and a groove on an outside surface touching an inside surface of the first cylindrical unit, and a projection is formed on the inside surface of the first cylindrical unit;
the first moving member moves along the groove with rotation by engaging the groove with the projection in a freely sliding manner and moving the first moving member in an axis direction of the axis member.

5. The connection mechanism according to claim 1, wherein:
the axis member extends close to the aperture of the first cylindrical unit;
a bottom of the second cylindrical unit has an insertion hole into which the axis member can be inserted;
when the second cylindrical unit pushes the first moving member toward the bottom of the first cylindrical unit, the axis member is inserted into the insertion hole, the axis member pushes the second moving member in an inverse direction of an urging direction of the urging member, and linearly moves the second moving member from a third position in which a liquid in the second connection unit does not flow into the second liquid path to a fourth position in which a liquid in the second connection unit flows into the second liquid path.

6. The connection mechanism according to claim 5, wherein
when the first connection unit is connected to the second connection unit, first a position of the moving aperture is the second position, then a position of the second liquid path is the fourth position, and when the connection between the first connection unit and the second connection unit is released, first a position of the second liquid path is the third position, and then a position of the moving aperture is the first position.

7. The connection mechanism according to claim 1, wherein
a state transition from a connected state to a disconnected state by the first and second connection unit, or a state transition from the disconnected state to the connected state is performed in a state in which a central axis of the first cylindrical unit and a central axis of the second cylindrical unit are on a same axis line.

8. The connection mechanism according to claim 6, wherein
a state transition from a connected state to a disconnected state by the first and second connection unit, or a state transition from the disconnected state to the connected state is performed in a state in which a central axis of the first cylindrical unit and a central axis of the second cylindrical unit are on a same axis line.

9. The connection mechanism according to claim 1, wherein
the first position is above the second position in a perpendicular direction.

10. The connection mechanism according to claim 1, wherein
when the first connection unit is arranged opposite the second connection unit, the first aperture and the second aperture are opposite each other.

11. The ink supply apparatus according to claim 1, wherein
when the first connection unit is arranged opposite the second connection unit, the first aperture and the second aperture are opposite each other.

12. An ink supply apparatus, having an ink cartridge for storing ink and a holder unit for holding the ink cartridge, to supply ink by connecting a first connection unit provided for the holder unit to a second connection unit provided for the ink cartridge, wherein
the first connection unit includes: a first cylindrical unit whose connection end has an aperture; an axis member fixed to a bottom opposite the aperture of the first cylindrical unit; a first ink path having a first aperture formed in the bottom; a first moving member fitting to the axis member and having a moving aperture moving while sliding on an inside surface of the first cylindrical unit in the axis direction of the axis member; and an urging member for urging the first moving member toward the connection end;
the second connection unit includes: a second cylindrical unit having a second aperture whose connection end side is a bottom; a second moving member provided inside the second cylindrical unit and having a second ink path at a position opposite the second aperture; and an urging member for urging the second moving member toward the connection end; and
by pushing the second cylindrical unit into the first cylindrical unit, in the first connection unit, the first moving member moves by rotating along the axis member from a first position in which a position of the moving aperture is not opposite the first aperture to a second position in which the position of the moving aperture is opposite the first aperture, and in the second connection unit, the second moving member linearly moves from a third position in which the ink in the ink cartridge does not flow into the second ink path to a fourth position in which the ink in the ink cartridge flows into the second ink path, and when the second connection unit is connected to the first connection unit, the second aperture is linked to the first aperture through the moving aperture.

13. The ink supply apparatus according to claim 12, wherein
when the first connection unit is connected to the second connection unit, first a position of the moving aperture is the second position, then a position of the second ink path is the fourth position, and when the connection between the first connection unit and the second connection unit is released, first a position of the second ink path is the third position, and then a position of the moving aperture is the first position.

14. The ink supply apparatus according to claim 12, wherein:
the first moving member has a fitting hole for fitting to the axis member and a projection formed on an inside surface of the fitting hole, and a groove is formed on an outside surface of the axis member;

the first moving member moves along the groove with rotation by engaging the projection with the groove and moving the first moving member in an axis direction of the axis member.

15. The ink supply apparatus according to claim 12, wherein
the first moving member has a fitting hole fitting to the axis member and a projection on an outside surface touching an inside surface of the first cylindrical unit, and a groove is formed on the inside surface of the first cylindrical unit;
the first moving member moves with rotation along the groove by engaging the projection with the groove and moving the first moving member in an axis direction of the axis member.

16. The ink supply apparatus according to claim 12, wherein
the first moving member has a fitting hole fitting to the axis member and a groove on an outside surface touching an inside surface of the first cylindrical unit, and a projection is formed on the inside surface of the first cylindrical unit;
the first moving member moves along the groove with rotation by engaging the groove with the projection in a freely sliding manner and moving the first moving member in an axis direction of the axis member.

17. The ink supply apparatus according to claim 12, wherein:
the axis member extends close to the aperture of the first cylindrical unit;
a bottom of the second cylindrical unit has an insertion hole into which the axis member can be inserted;
when the second cylindrical unit pushes the first moving member toward the bottom of the first cylindrical unit, the axis member is inserted into the insertion hole, the axis member moves the second moving member from the third position to the fourth position.

18. The ink supply apparatus according to claim 17, wherein
when the first connection unit is connected to the second connection unit, first a position of the moving aperture is the second position, then a position of the second ink path is the fourth position, and when the connection between the first connection unit and the second connection unit is released, first a position of the second ink path is the third position, and then a position of the moving aperture is the first position.

19. The ink supply apparatus according to claim 12, wherein
the first position is above the second position in a perpendicular direction.

* * * * *